United States Patent [19]

Takayanagi

[11] Patent Number: 4,667,761

[45] Date of Patent: May 26, 1987

[54] CALIPER BODY SUPPORTING STRUCTURE FOR DISK BRAKES IN VEHICLES HAVING TWO REAR WHEELS

[75] Inventor: Shinji Takayanagi, Wako, Japan

[73] Assignee: Honda Giken Kogyo Kabushiki Kaisha, Tokyo, Japan

[21] Appl. No.: 867,983

[22] Filed: May 29, 1986

[30] Foreign Application Priority Data

May 31, 1985 [JP] Japan .................................. 60-82088

[51] Int. Cl.⁴ ............................................. B62D 61/08
[52] U.S. Cl. .................................. 180/217; 188/18 A;
188/344; 474/116
[58] Field of Search .................. 180/210, 215, 217;
188/18 A, 344; 474/112, 116

[56] References Cited

U.S. PATENT DOCUMENTS 3,817,342 6/1974 Hamilton ..................... 188/18 A
4,541,502 9/1985 Iwai et al. ....................... 180/217

FOREIGN PATENT DOCUMENTS 59-170537 9/1984 Japan .................................. 188/344

Primary Examiner—John J. Love
Assistant Examiner—Kenneth R. Rice
Attorney, Agent, or Firm—Armstrong, Nikaido, Marmelstein & Kubovcik

[57] ABSTRACT

The invention provides a caliper body supporting structure for disk brakes in vehicles having two rear wheels, which is characterized by including a pipe member fixed to the rear end of a swing arm supported on a body frame for vertically pivotal movement; a holder member provided on said pipe member, having therethrough an eccentric bore; an axle for the rear wheels rotatably supported within said eccentric bore of said holder member, said axle being driven by way of a drive chain; a driven sprocket and a disk rotor both fitted over said axle; a caliper body of the disk brake attached to a caliper stay rotatably supported on said holder member; a longitudinally elongated hole formed in said caliper stay, and a pin extending from said swing arm and designed to be inserted into said elongated hole so as to support said caliper stay movably with respect to said pin.

2 Claims, 6 Drawing Figures ically 4,667,761

CALIPER BODY SUPPORTING STRUCTURE FOR DISK BRAKES IN VEHICLES HAVING TWO REAR WHEELS

FIELD OF THE INVENTION AND RELATED ART STATEMENT

The present invention relates to a caliper body supporting sturucture for disk brakes used with three- or four-wheeled automobiles having two rear wheels driven by way of a drive chain.

In the conventional type of a vehicle having two rear wheels driven by way of a drive chain, the two rear wheels are supported at the rear end of the swing arm for pivotal movement, and the swing arm is supported on its front end on the body frame for vertically pivotal movement.

One example of such vehicles is disclosed in Japanese Utility Model Laid-Open Publication No. 58 (1983)-181,689, and will now be explained with reference to FIGS. 1 and 2. FIGS. 1 and 2 are respectively a partly cut-away plan view and a partly sectioned side view showing the rear half portion of a swing arm.

As illustrated in FIGS. 1 and 2, a swing arm generally shown at 50 includes a pipe member 52 fixed to its rear end. In the pipe member 52, there is fitted a holder member 56 having therethrough an eccentric bore 54, the center O' of which is made eccentric with respect to the center O of the member 52 by $\alpha$(alpha). The holder member 56 is fixedly clamped to the pipe member 52 by means of a bolt 58. Upon the bolt 58 being loosened for chain adjustment, the holder member 56 is turnable with respect to the pipe member 52.

An axle 62 for the rear wheels is inserted and supported within the eccentric bore 54 of the holder member 56 through bearings 60. The axle 62 is fitted thereover with a driven sprocket 66 for applying a drive chain 64 thereover, and a disk rotor 68. On the the holder member 56 in the vicinity of the disk rotor 68, there is rotatably mounted a caliper stay 70. A caliper body 72 of the disk brake is secured to the caliper stay 70 through a bracket 74. The front end of bracket 74 is rotatably supported on one end of a torque link 76 for receiving a braking torque transmitted to the caliper body 72. The torque link 76 is supported at the other end on a shaft 78 extending from one side of the swing arm 50.

In order to adjust the slack of the drive chain 64, the bolt 58 is first loosened, and the holder member 56 is then turned within the pipe member 52 by means of a suitable tool to move the eccentric bore 54 of holder member 56 with the rear wheel axle 62 to-and-fro with respect to a body frame. As the center O' of the axle 62 is moved rearwardly to A, as shown in FIG. 2, the fixed end of the caliper stay 70 is correspondingly moved to shift the center of connection of the bracket 74 with the torque link 76 from position B to B' in FIG. 2.

In this manner, the inclination of the caliper body 72 after chain adjustment is limited by joining the caliper body 72 to the swing arm 50 through the torque link 76.

The foregoing disk brake increases unavoidably in size and weight, since it is of the type that a braking torque occurring on the caliper body 72 is transmitted to the swing arm 50 through the torque link 76, which is then required to possess sufficient rigidity.

OBJECT AND SUMMARY OF THE INVENTION

A first object of the present invention is to provide an improved structure for supporting the caliper body of the aforesaid disk brake, which dispenses with any torque link, can limit or reduce the inclination of the caliper body after chain adjustment, and can reduce the number of parts involved.

A second object of the present inventin is to provide a pin for supporting a bracket of the caliper body on a portion of a swing arm which has a high strength so as to allow it to receive a braking torque.

According to one aspect of the present invention, there is provided a vehicle having two rear wheels, which includes a swing arm supported on its front end on a body frame for vertically pivotal movement; a pipe member fixed at the rear end of said swing arm; a holder member having therethrough an eccentric bore, said holder member being fixedly clamped in place by said pipe member and being designed to be turnable during chain adjustment; an axle for the rear wheels, rotatably inserted into said eccentric bore of said holder member, a disk rotor and a driven sprocket for applying thereover a drive chain, said both parts being fitted over said axle for the rear wheels; a caliper stay rotatably mounted on said holder member in the vicinity of said holder member; and a caliper body of the disk brake, attached to said caliper stay; said vehicle being characterized in that said caiplter body includes a hole elongated longitudinally of said body frame, and a pin being inserted into said elongated hole extends from said swing arm so as to support said caliper stay movably with respect to said pin.

According to another aspect of the present invention, the invention is characterized in that said pin is interposed in between the junction of said pipe member provided at the rear end of said swing arm and a cross member located adjacent thereto.

The foregoing and other objects and features of the present invention will become apparent to those skilled in the art from the following detailed description with reference to the accompanying drawings.

DETAILED DESCRIPTION OF THE INVENTION

The present invention will now be explained with reference to FIGS. 3 to 6 showing one embodiment thereof applied to a buggy type of three-wheeled automobile.

Figure 1:
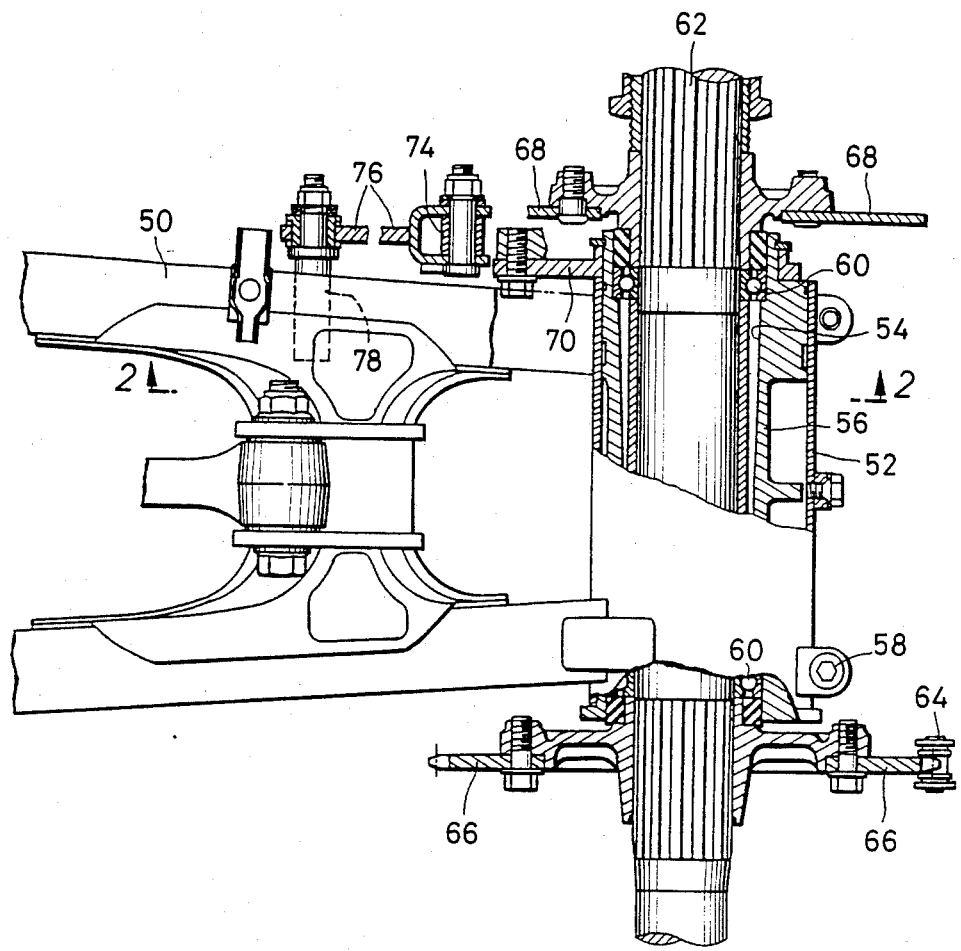
FIGS. 1 and 2 are respectively a partly cut-away plan view and a partly sectioned side view of the rear half portion of the conventional swing arm, and FIGS. 3 to 6 inclusive show one embodiment of the present invention, FIG. 3 being a general side view of a three-wheeled automobile, FIG. 4 being a general plan view thereof, FIG. 5 being a partly sectioned plan view of a swing arm, and FIG. 6 being a sectional view taken along the line 6—6 of FIG. 5.
Figure 2:
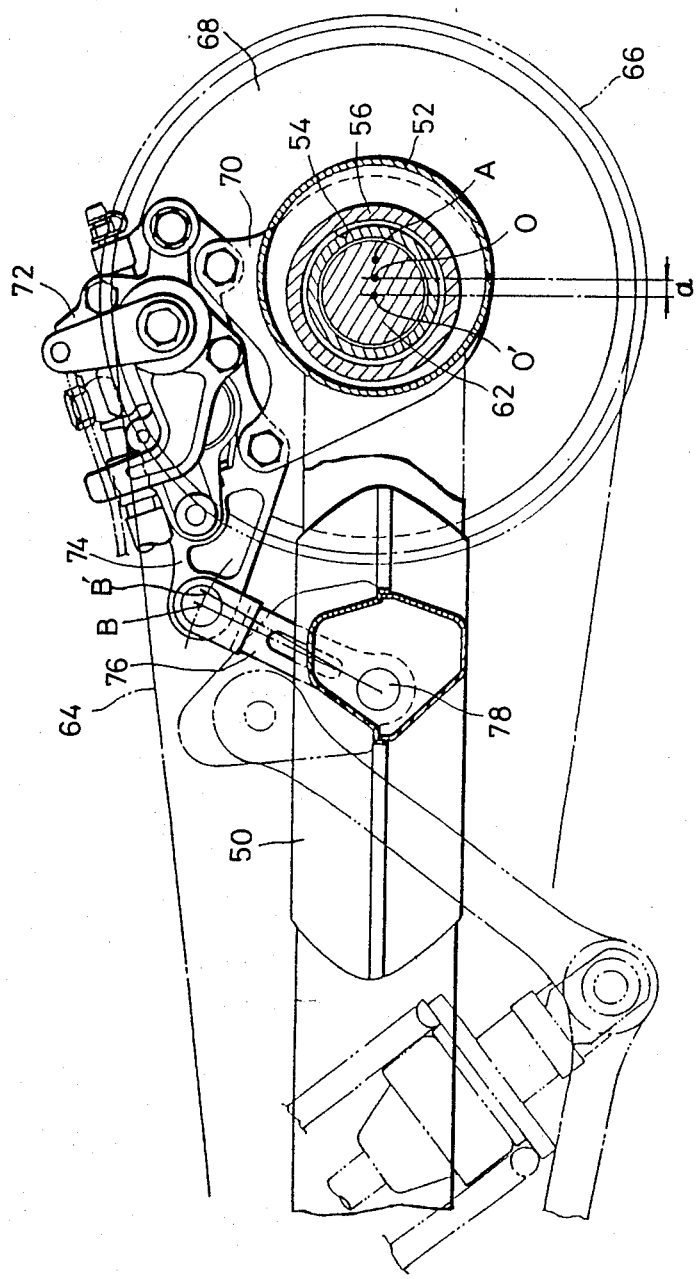
Figure 3:
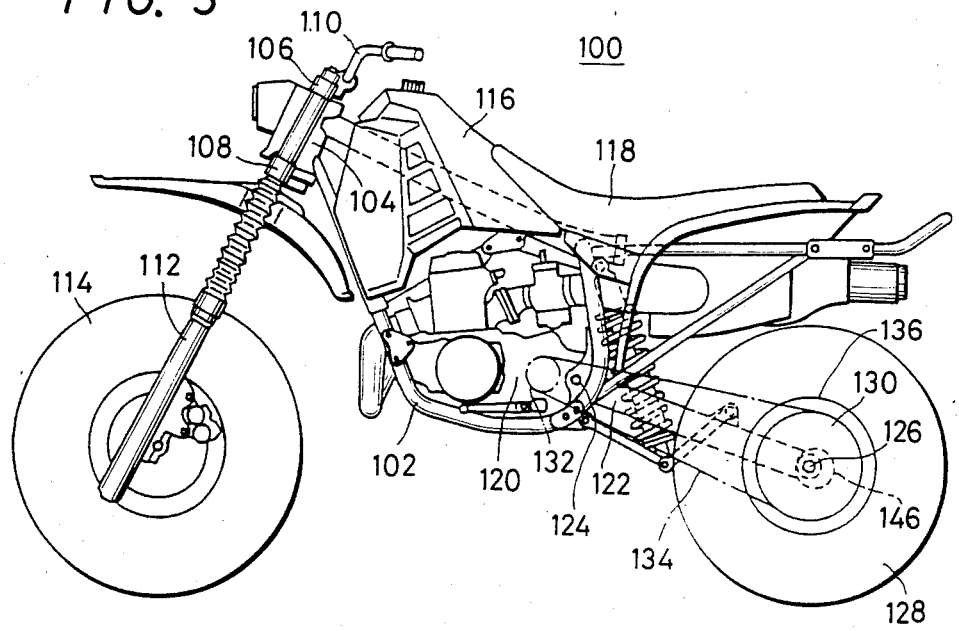
Figure 4:
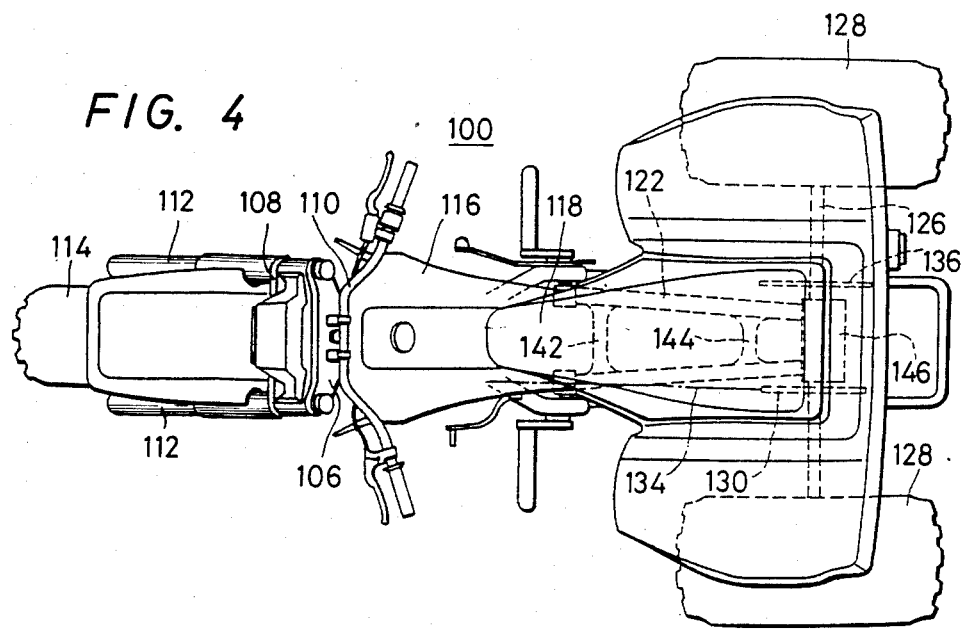

Referring now to FIGS. 3 and 4, a buggy type of three-wheeled automobile generally shown at 100 includes a body frame 102 fixed at its front end to a head pipe 104, into which is inserted a stem pipe provided with top and bottom bridges 106 and 108. The top bridge 106 is provided with a handlebar 110, and a front fork 112 is fixedly inserted at its upper portion in between both bridges 106 and 108. The front fork 112 is rotatably supported at its lower end with a front wheel 114 serving as a steering wheel.

On the body frame 102 in the rear of the head pipe 104, there is mounted a fuel tank 116, following which a seat 118 is mounted. An engine 120 is mounted on the body frame 102 below the fuel tank 116.

Figure 5:
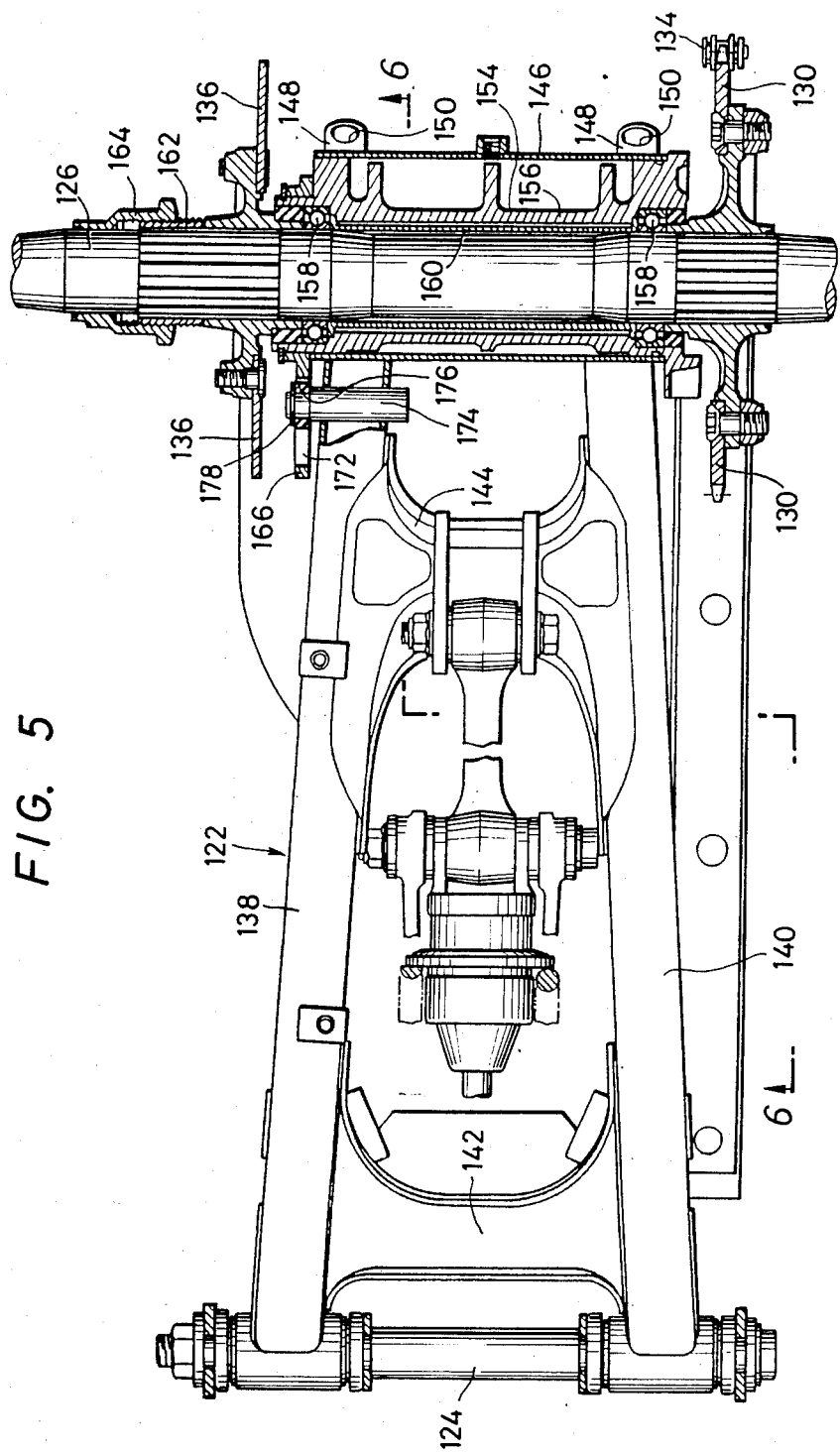
Figure 6:
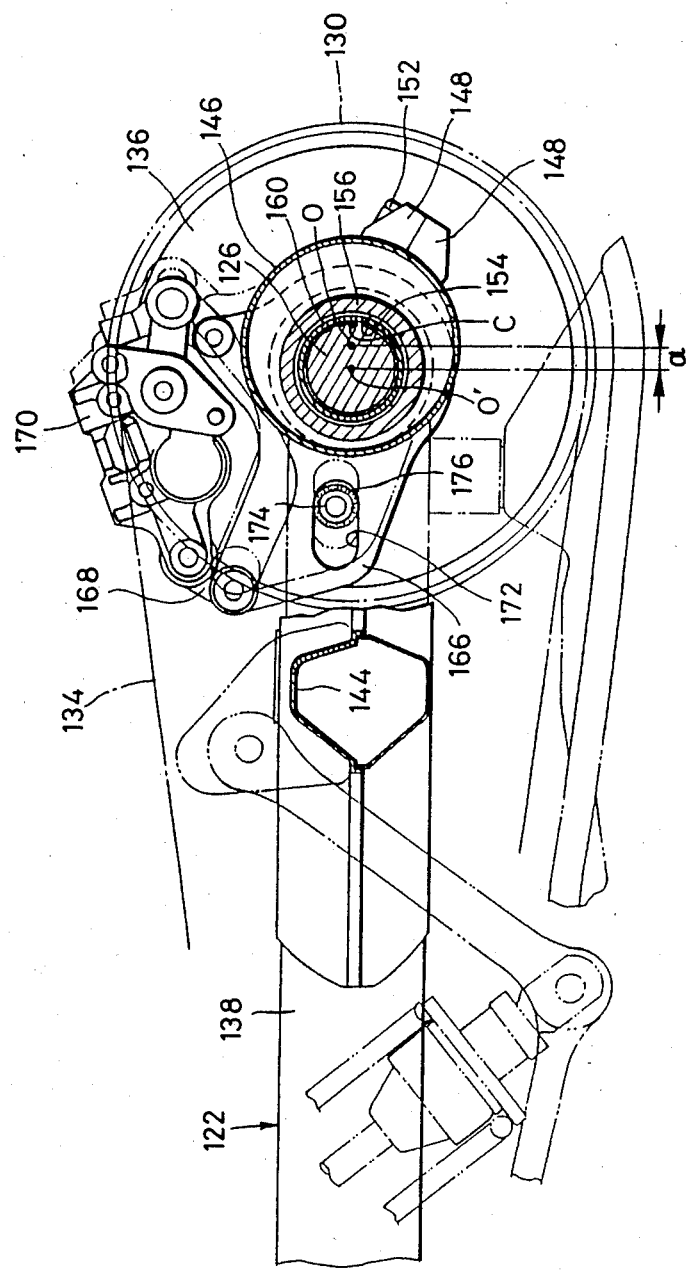

On the substantially central portion of the body frame 102, the front end of a swing arm 122, the details of which are shown in FIGS. 5 and 6, is supported by means of a pivot shaft 124 for vertically pivotal movement. An axle 126 for the rear wheels is rotatably inserted into the rear end of the swing arm 122, and includes at both ends rear wheels 128 and 128.

A driven sprocket 130 is fitted on the one side of the axle 126, and a drive chain 134 is applied under tension between and around drive sprockets 132 and an output shaft (not shown) of the engine 120. A disk rotor 136 is fitted on the other side of the axle 126.

As illustrated in FIGS. 5 and 6, the swing arm 122 is of the sturucture which includes a pair of arm members 138 and 140 connected at the front and rear portions to each other with cross members 142 and 144.

As also illustrated in FIGS. 5 and 6, the swing arm 122 is fixedly provided at its rear end with a pipe member 146, which is formed on both edges of the rear portion with slits (not shown). On the end edges of the member 146, there are brackets 148 and 148 with the slits being located therebetween. The brackets 148 and 148 are provided therethrough with bores 150 through which clamping bolts 152 are threadedly inserted.

Through the pipe member 146, there is inserted a bearing holder member 156 having an eccentric bore 154, the center 0' of which is made eccentric with respect to the center O of the pipe member 146 by α(alpha), as illustrated in FIG. 6. The holder member 156 is then tightly held on the pipe member 146 by clamping of the clamping bolts 152.

The aforesaid rear wheel axle 126 is inserted into the eccentric bore 154 in the holder member 156, and is rotatably supported with left and right bearings 158 and 158 fitted into the eccentric bore 154, as illustrated in FIG. 5. In FIG. 5, reference numerals 160, 162 and 164 stand for a collar, a nut and a lock nut, respectively.

On the holder member 156 in the vicinity of the disk rotor 136, there is rotatably supported a caliper stay 166, which is provided with a caliper body 170 of the disk brake through a bracket 168. In addition, the caliper stay 166 includes a hole 172 elongated longitudinally of the vehicle body.

An outwardly projecting pin 174 is located between the pipe member 146 of one arm member 138 of said swing arm 122 and the rear cross member 144. To support the caliper stay 166 for movement, that pin 174 is inserted into the elongated hole 172 in the caliper stay 166 through an elastic bushing 176 with the end portion thereof projecting from said hole 172 being fitted thereover with a snap ring 178 to prevent disengagement thereof.

In accordance with the embodiment as arranged above, adjustment of tension of the drive chain 134 is achieved by turning the holder member 156 by means of a suitable tool.

Referring to FIG. 6 illustrating that the rear wheel axle 126 is located at its foremost position in the pipe member 146, when it is intended to move the rear wheel axle 126 rearwardly to increase the tension of the drive chain 134, the clamping bolts 142, by which the holder member 156 is now clamped in place, are loosened to make the holder member 156 turnable within the pipe member 146.

As the holder member 156 is then turned in the clockwise direction, for instance, in FIG. 6 with a tool, the center O' of the eccentric bore 154 shifts rearwardly from the illustrated position to a maximum of a point C, since it is made eccentric with respect to the cneter O of the pipe member 146 by α(alpha). This causes that the rear wheel axle 126 concentrically inserted through said bore 154 and the driven sprocket 130 fitted over the axle 126 are retracted by the same amount. As a result, the space between the drive sprocket 132 and the driven sprocket 130 is increased, whereby the drive chain 134 is applied under the desired tension.

Thereafter, the clamping bolts 142 are again clamped to tightly secure the holder member 156 to the pipe member 146 for the completion of chain adjustment.

The caliper stay 166 having its fixed end supported on the rearwardly moving holder member 156 is moved rearwardly, while the elongated hole 172 is guided by the pin 174. During the rearward movement of the caliper stay 166, the inclination of the caliper body 170 reaches a maximum, when the center O' of the eccentric bore 154 is located above the center O of the pipe member 146. However, this inclination is limited to the minimum one corresponding to the eccentric amount of α(alpha) alone. Thus, the inclination of the caliper body can be limited or reduced, even if it reaches a maximum, or can be absorbed by the rotation of the bushing 176 interposed between the elongated hole 172 and the pin 174.

The foregoing embodiment can stand up to a large braking torque, since a braking torque occurring on the caliper body 170 during braking is transmitted from the caliper stay 166 through the pin 174 to the junction of the cross member 144 and the pipe member 146.

Furthermore, since the caliper stay 166 is supported turnably with respect to the holder member 156, and movably with respect to the pin 174, any work for loosening the mounting bolts, etc. for the caliper body 170 can be dispensed with, when effecting chain adjustment.

Since it is also unnecessary to use any torque link used in the prior art, it is possible to obtain a simple structure which is decreased in weight and comprises a reduced number of parts.

It is understood that, while the instant embodiment has been described as being applied to a three-wheeled automobile, the present invention is applicable to vehicles such as four-wheeled automobiles of the chain driven type.

Obviously, many modifications and variations of the present invention are possible in the light of above teachings. It is therefore to be understood that within the scope of the appended claims, the invention may be practiced otherwise than as specifically described.

What is claimed is:

1. A caliper body supporting structure for disk brakes in vehicles having two rear wheels including:
   a swing arm supported at the front end thereof on a body frame for vertically pivotal movement,
   a pipe member fixed at the rear end of said swing arm,
   a holder member having therethrough an eccentric bore, said holder member being fixedly clamped in place by said pipe member and being designed to be turnable during chain adjustment,
   an axle for said rear wheels, rotatably inserted into said eccentric bore of said holder member, a disk rotor and a driven sprocket for applying thereover a drive chain, said both parts being fitted over said axle for said rear wheels, a caliper stay rotatably mounted on said holder member in the vicinity of said holder member, and a caliper body of the disk brake, attached to said caliper stay, wherein:

said caliper body includes a hole elongated longitudinally of said body frame, and a pin to be inserted into said elongated hole extends from said swing arm so as to support said caliper stay movably with respect to said pin.

2. The structure as defined in claim 1, wherein:

said swing arm includes a pair of arm portions connected to each other by a plurality of cross members, and said pin is interposed in between the junction of said pipe member of said swing arm and the cross member adjacent to said pipe member.

* * * * *